(12) United States Patent
Nolasco

(10) Patent No.: US 8,366,155 B1
(45) Date of Patent: Feb. 5, 2013

(54) COUPLER

(75) Inventor: Salomon A. Nolasco, Savannah, GA (US)

(73) Assignee: Goodwill Industries of the Coastal Empire, Inc., Savannah, GA (US)

(*) Notice: Subject to any disclaimer, the term of this patent is extended or adjusted under 35 U.S.C. 154(b) by 188 days.

(21) Appl. No.: 12/779,170

(22) Filed: May 13, 2010

(51) Int. Cl.
*F16L 19/00* (2006.01)

(52) U.S. Cl. .......... 285/354; 285/81; 285/330; 285/386; 285/387

(58) Field of Classification Search ............... 285/298, 285/330, 354, 386–387, 123.15–123.16, 285/223
See application file for complete search history.

(56) References Cited

U.S. PATENT DOCUMENTS

| | | | | |
|---|---|---|---|---|
| 438,356 A * | 10/1890 | McEnany | | 285/74 |
| 2,318,590 A * | 5/1943 | Boynton | | 285/81 |
| 3,211,472 A | 10/1965 | Rickard | | |
| 3,669,472 A * | 6/1972 | Nadsady | | 285/87 |
| 3,695,640 A | 10/1972 | Clague | | |
| 3,794,363 A * | 2/1974 | Schulz | | 285/363 |
| 4,127,286 A | 11/1978 | Albertson | | |
| 4,637,636 A | 1/1987 | Guest | | |
| 4,706,997 A | 11/1987 | Carstensen | | |
| 4,770,448 A | 9/1988 | Strickland et al. | | |
| 4,808,117 A * | 2/1989 | Gale et al. | | 439/192 |
| 4,810,010 A | 3/1989 | Jones | | |
| 4,878,697 A | 11/1989 | Henry | | |
| 4,928,202 A * | 5/1990 | Gale et al. | | 361/215 |
| 5,121,949 A | 6/1992 | Reese | | |
| 5,131,695 A | 7/1992 | Wiser | | |
| 5,871,239 A * | 2/1999 | Boscaljon et al. | | 285/81 |
| 6,039,361 A | 3/2000 | Meli | | |
| 6,511,098 B1 | 1/2003 | Luterstein | | |
| 6,832,790 B2 | 12/2004 | Olson | | |
| 6,883,836 B2 * | 4/2005 | Breay et al. | | 285/189 |
| 6,974,162 B2 | 12/2005 | Chelchowski et al. | | |
| 6,988,746 B2 | 1/2006 | Olson | | |
| 7,270,351 B2 | 9/2007 | Chelchowski et al. | | |
| 2006/0014427 A1 | 1/2006 | Islam et al. | | |
| 2006/0157975 A1* | 7/2006 | Fujii et al. | | 285/247 |

* cited by examiner

*Primary Examiner* — Aaron Dunwoody
*Assistant Examiner* — Fannie Kee
(74) *Attorney, Agent, or Firm* — Daniel C. Leonardi; John B. Hardaway, IIII; Nexsen Pruet, LLC

(57) ABSTRACT

A coupler for use in sealing a joint between two pipes. The coupler is comprised primarily of two center sections and two end caps. The two center sections are engagable with one another and the two end caps are engagable with the center sections. Gasket rings create seals between the two center sections as well as between the two center sections and the cap rings. The center sections are dimensioned to create a volume of space within the coupler, thus permitting the coupler to accommodate offset joints. The gasket rings between the cap rings and the center sections can be longitudinally spaced apart, minimizing the angular deflection of the coupler with respect to the pipes when the pipe joint is offset. The center sections and end caps can be lockably engaged.

4 Claims, 9 Drawing Sheets

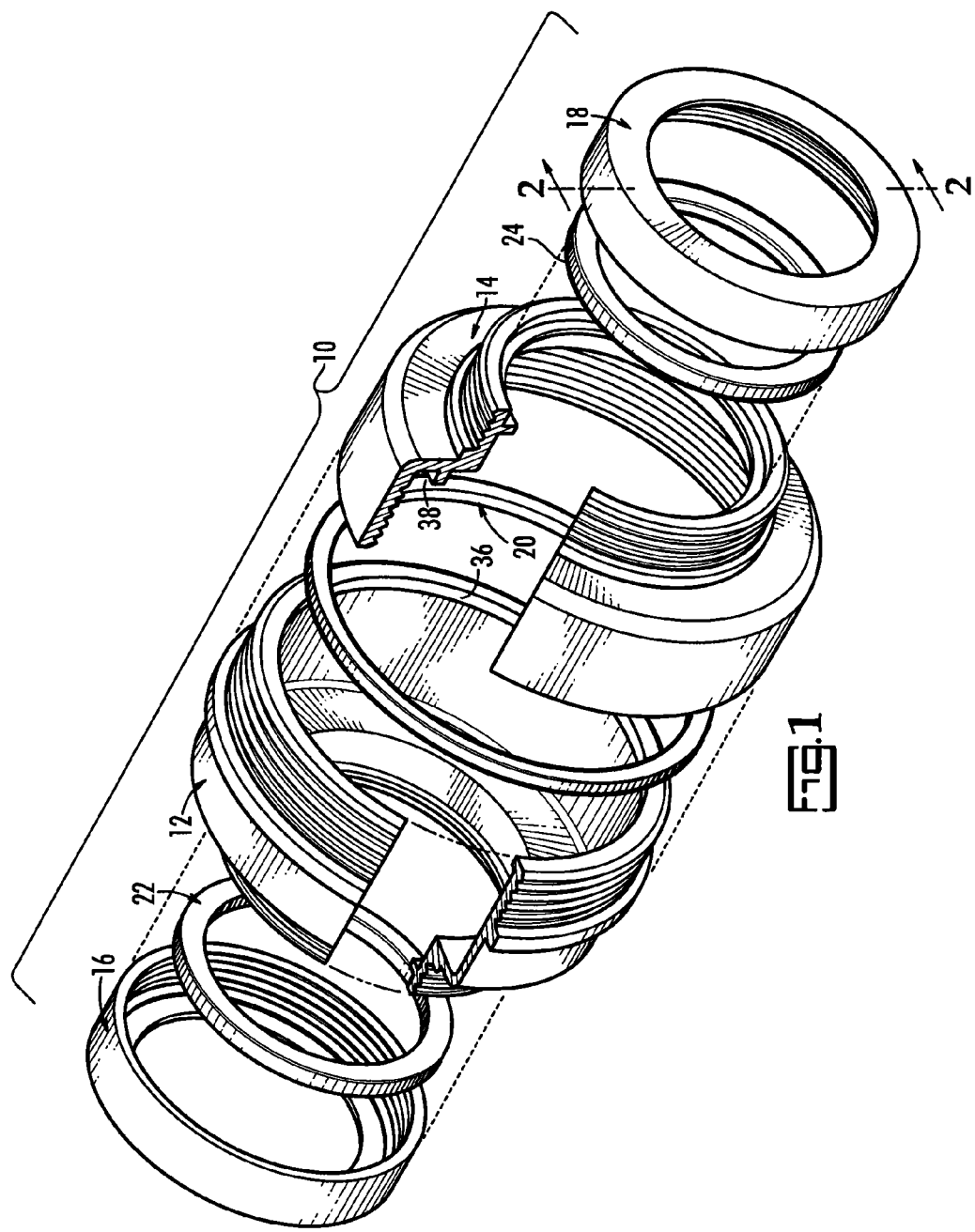

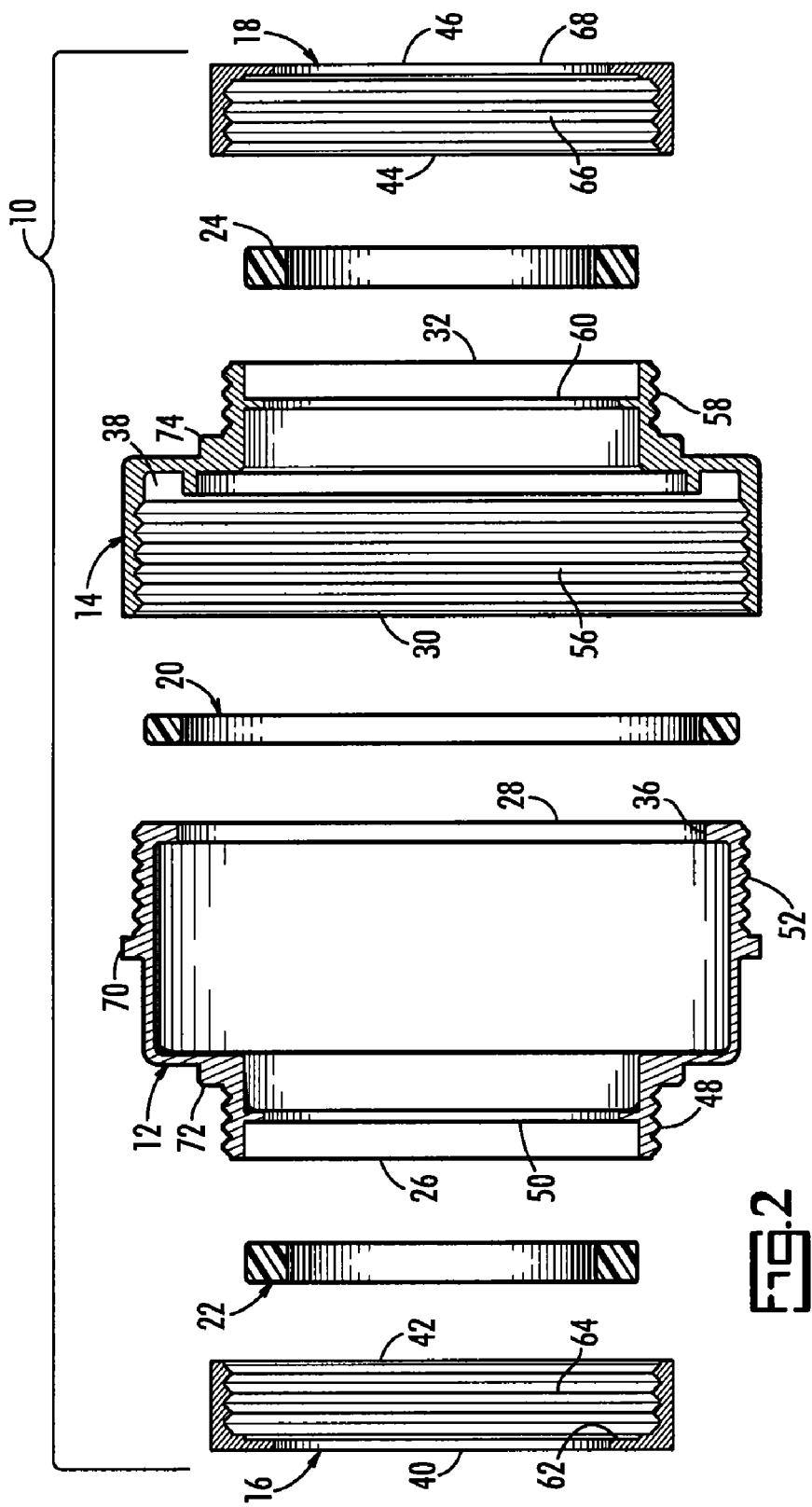

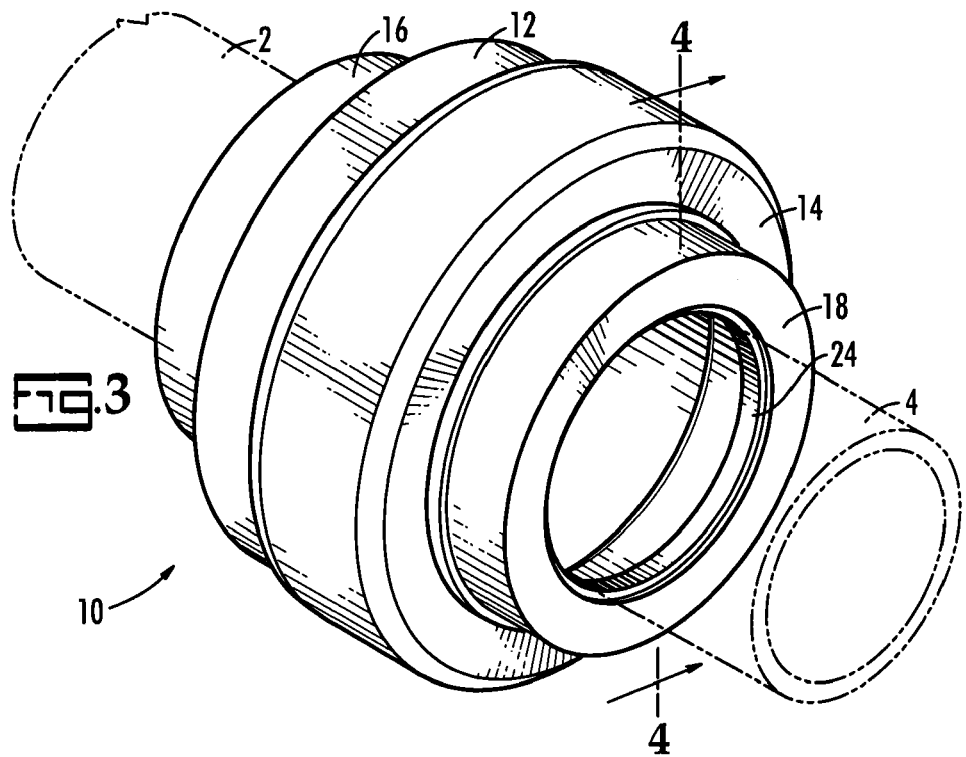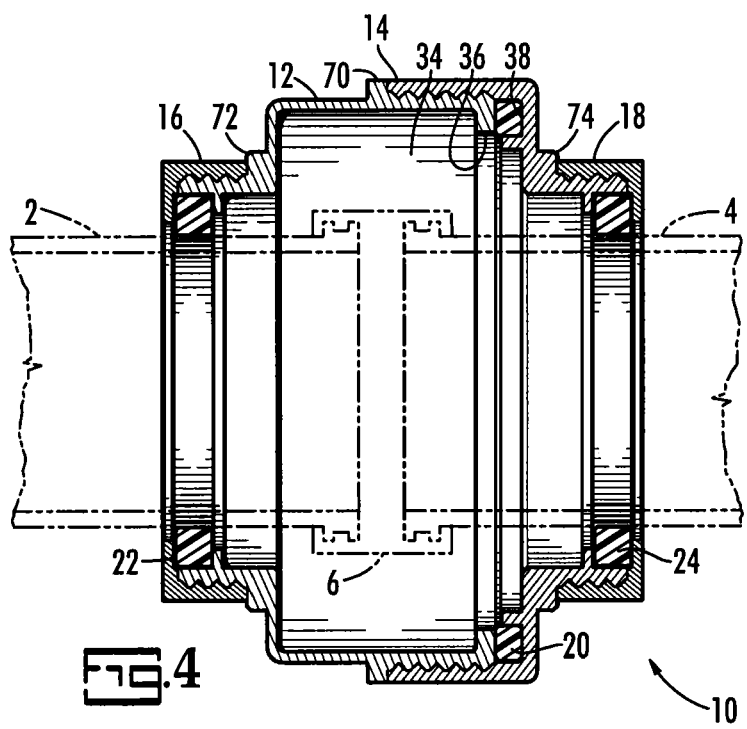

COUPLER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISC APPENDIX

Not Applicable.

BRIEF DESCRIPTION OF THE DRAWINGS

The invention is illustrated in the accompanying drawings, in which:

FIG. 1 is an exploded, perspective of a disassembled coupler according to one embodiment of the present invention;

FIG. 2 is an exploded cross-sectional view of a disassembled coupler according to one embodiment of the present invention;

FIG. 3 is a perspective view of an assembled coupler according to one embodiment of the present invention;

FIG. 4 is a cross-sectional view of an assembled coupler according to one embodiment of the present invention;

DETAILED DESCRIPTION OF EMBODIMENTS

Figure 5:
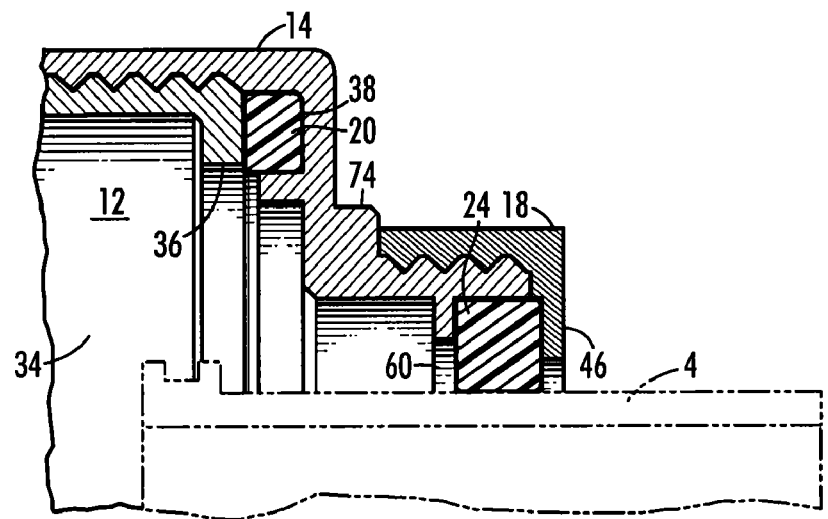
FIG. 5 is a cross-sectional detail of an assembled coupler according to one embodiment of the present invention.

As illustrated in FIG. 1, the coupler 10 of the present invention can be used as a redundant coupler or primary coupler; the term "redundant" here meaning that the coupler 10 of the present invention can be installed over an existing primary coupler (see FIG. 4). It is suitable for use with all types of fluids and in positive or negative pressure environments.

The coupler 10 of the present invention is generally comprised of four rigid components 12, 14, 16, and 18 and three gasket rings 20, 22, and 24. The rigid components include a first center section 12, a second center section 14, a first cap ring 16 and a second cap ring 18. (Note that when components or sides of components are described herein as "first" and "second," etc., the "first" will typically be to the left of the "second." The two exceptions to this convention being the three gasket rings and three abutments, as explained below. For the gasket rings and abutments, the component in the middle position is referred to as the "first.") These rigid components are typically cylindrical. As used herein, the term "cylindrical" is used to refer to the general shape of the component and does not mean that the component (1) does not vary in size from one end to the other (e.g. is not stepped or belled), and (2) does not have other surface features, including but not limited to threads, abutments, tabs, and flanges.

Turning now to FIG. 2, the rigid components 12, 14, 16, and 18 each have first and second end. First center section 12 has a first end 26 and a second end 28. Second center section 14 has a first end 30 and a second end 32. First cap ring 16 has a first end 40 and a second end 42. Second cap ring 18 has a first end 44 and a second end 46. Abutting ends of these components are designed to engage one another. Accordingly, the second end 28 of the first center section 12 is dimensioned to engage the first end 30 of second center section 14. Likewise, the second end 42 of first cap ring 16 is dimensioned to engage the first end 26 of first center section 12 and the first end 44 of second cap ring 18 is dimensioned to engage the second end 32 of the second center section 14.

Furthermore, a gasket ring is positioned between the center sections 12 and 14 and also between each cap ring 16 and 18 and the center the cap ring engages. Specifically, first gasket ring 20 resides between first center section 12 and second center section 14, second gasket ring 22 resides between first cap ring 16 and first center section 12, and third gasket ring 24 resides between second center section 14 and second cap ring 18. When the rigid components 12, 14, 16, and 18 are engaged, the gasket rings 20, 22, and 24 allow for a seal to be created between the components. The second and third gasket rings 22 and 24, in addition to creating a seal between the cap rings 16 and 18 and the center section 12 and 14, also create a seal around the pipes 2 and 4 (FIG. 3).

The particular embodiment of the present invention 10 shown in FIG. 2 has threads to allow the rigid components to engage one another. Specifically, the outer surfaces 48 and 52 of first and second ends 26 and 28 of first center section 12 are threaded. Likewise, the inside surface 56 of the first end 30 and the outside surface 58 of the second end 32 of the second center section 14 are threaded. Finally, the inside surfaces 64 and 66 of cap rings 16 and 18, respectively, are threaded. Of course, the present invention is not limited to using threads to make the rigid components engagable. Any means known in the art could be used to combine the components and this disclosure and the claims appended hereto should be read to include all means known in the art.

In further reference to FIG. 2, this particular embodiment of the present invention has flanges 36, 50, 60, 62, and 68 and groove 38 to engage gasket rings 20, 22, and 24. Specifically, first gasket ring 20 is received between flange 36 in first center section 12 and groove 38 in second center section 14. Likewise, second gasket ring 22 is received between flange 62 and flange 50 and third gasket ring 24 is received between flange 60 and flange 68. Herein, references to, for example, "the flanged inner surface 62 of first cap ring 16" and "the flange 62 on the inner surface of first cap ring 16" mean the same thing—the term "flanged" simply meaning that there is a flange thereon.

Continuing to refer to FIG. 2, in this particular embodiment of the present invention, the second end 28 of first center section 12 and the first end 30 of second center section 14 are larger in diameter than the first end 26 of first center section 12 and second end 32 of second center section 14. This feature creates a volume of space 34 (FIGS. 4 and 5) inside the coupler 10 sufficient to allow the coupler 10 of the present invention to be used over a separate primary coupler 6 (FIG. 4). Furthermore, as more fully explained below, this volume of space contributes to this coupler's ability to maintain its seal around the joint even when the joint is offset. Because this coupler does not bear directly on the joint itself (i.e. at or near the very ends of the pipes 2 and 4), if the joint is offset, it has little effect on the coupler. The volume of space 34 inside the coupler 10 allows the coupler 10 to accommodate an offset joint without losing its seal around the joint. Moreover, the manner in which the joint is offset (longitudinally, laterally, angularly, or any combination of the above) is immaterial.

FIG. 3 shows a perspective view of a coupler 10 according to one embodiment of the present invention installed upon the joint between pipes 2 and 4. Referring now to FIGS. 4 and 5, this particular embodiment of coupler 10 has abutments 70, 72, and 74, which prevent the over tightening of the components and resulting deformation of the gasket rings. Specifically, abutment 70 prevents second center section 14 from being over tightened onto first center section 12, thereby preventing gasket ring 20 from being deformed. Likewise, abutment 72 prevents first cap ring 16 from being over tightened onto first center section 12, thereby preventing gasket ring 22 from being deformed. Finally, abutment 74 prevents second cap ring 18 from being over tightened onto second center section 14, thereby preventing third gasket ring 24 from being deformed.

Figure 12A:
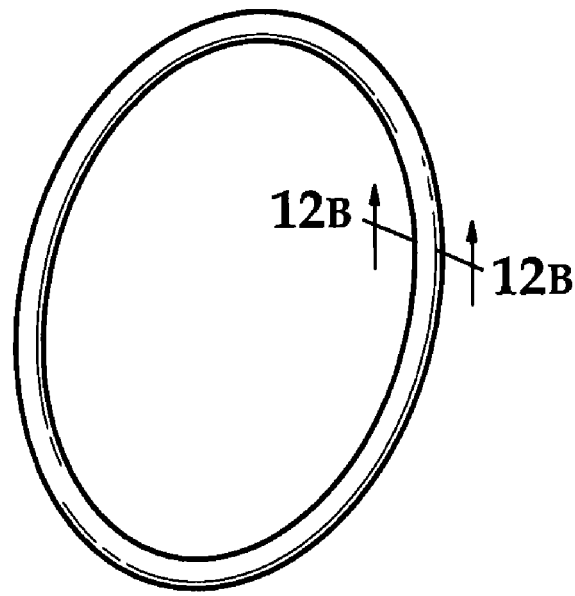
FIGS. 12A and 12B show perspective and cross-sectional views, respectively, of a gasket having a round cross-section.
Figure 12B:
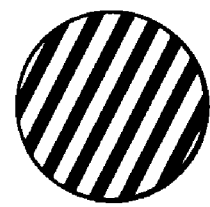
Figure 13A:
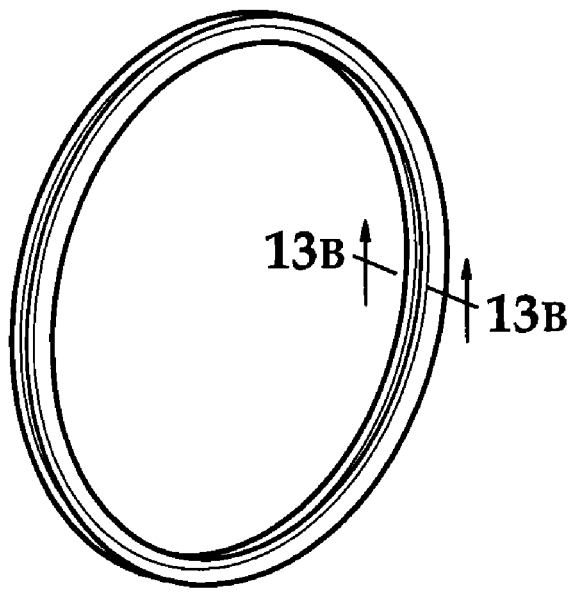
FIGS. 13A and 13B show perspective and cross-sectional views, respectively, of a gasket having an X-shaped cross-section.
Figure 13B:

With respect to gasket rings 20, 22, and 24, although the gasket rings in the figures have a square cross-section, the present invention can utilize gasket rings of a variety of configurations. For example, one or more of the gasket rings can have a rectangular cross section, a circular or oval cross section (FIGS. 12A and 12B), an X-shaped cross section (FIGS. 13A and 13B), or a C-shaped cross section. Gasket rings having any configuration known in the art can be utilized with the coupler 10 of the present invention. Furthermore, the gasket rings can be made of any single material known in the art as well as any composite material known in the art. In further reference to FIG. 4, note that in this particular embodiment of the present invention second and third gasket rings 22 and 24 are spaced apart from the joint between pipes 2 and 4. This feature permits the coupler of the present invention to maintain its seal around the pipe joint even when the pipes are offset.

Figure 6:
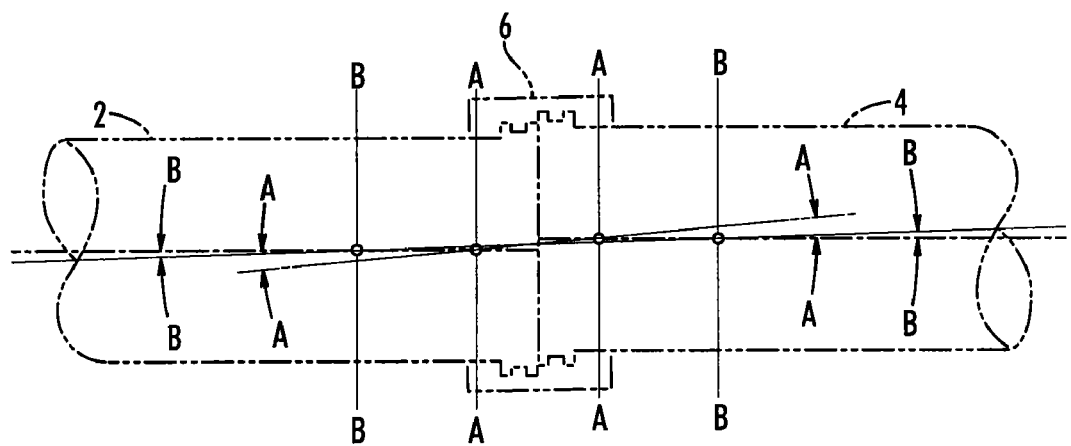
FIG. 6 is an illustrative diagram showing a parallel, lateral offset pipe joint and the reduced angular misalignment between the pipes and the coupler achieved when the seals engaging the offset pipes are spaced from the offset joint, as in the present invention.

Referring now to FIG. 6, an illustrative figure that does not show the coupler of the prior art but is intended to show the advantage of spacing longitudinally the second and third gasket rings 22 and 24 (i.e. apart from one another and from the ends of pipes 2 and 4). Note first that the pipe joint in FIG. 6 is laterally offset. That is, the centerlines of pipes 2 and 4, while parallel, are not coincident. When this occurs, any coupler that is used to seal the joint will span from the first pipe to the second pipe and will be at an oblique angle (slightly out of parallel) with respect to both pipes. FIG. 6 shows that, as the two points at which the coupler contacts the pipes are moved farther apart and away from the joint, the degree to which the coupler is out of parallel with the pipes decreases. The closer the coupler is to being parallel with the pipes, the more likely it is to maintain its seal around the joint. Accordingly, it is advantageous to have the coupler contact the pipes longitudinally spaced away from the joint.

Figure 7:
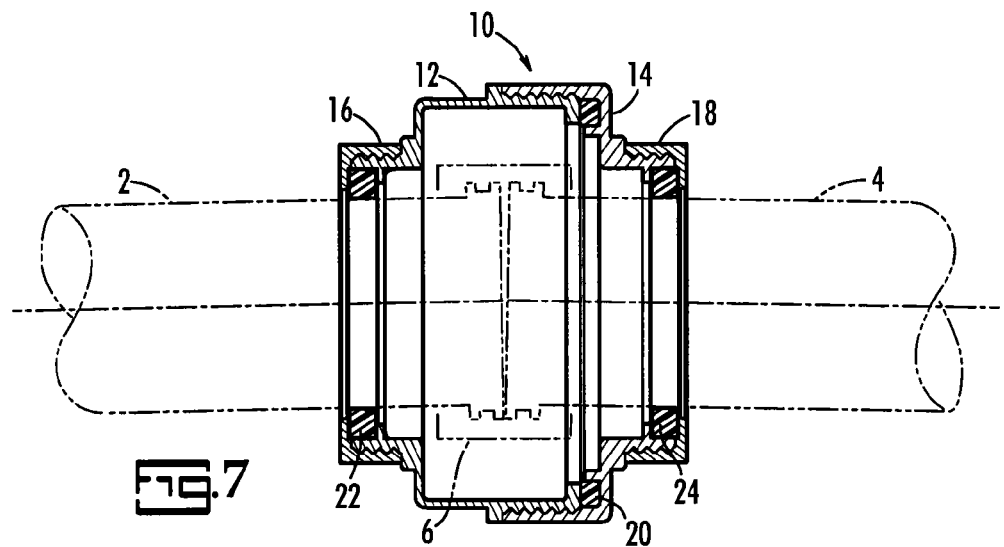
FIG. 7 is a cross-sectional view of a coupler according to one embodiment of the present invention installed on an angularly offset pipe joint.
Figure 8:
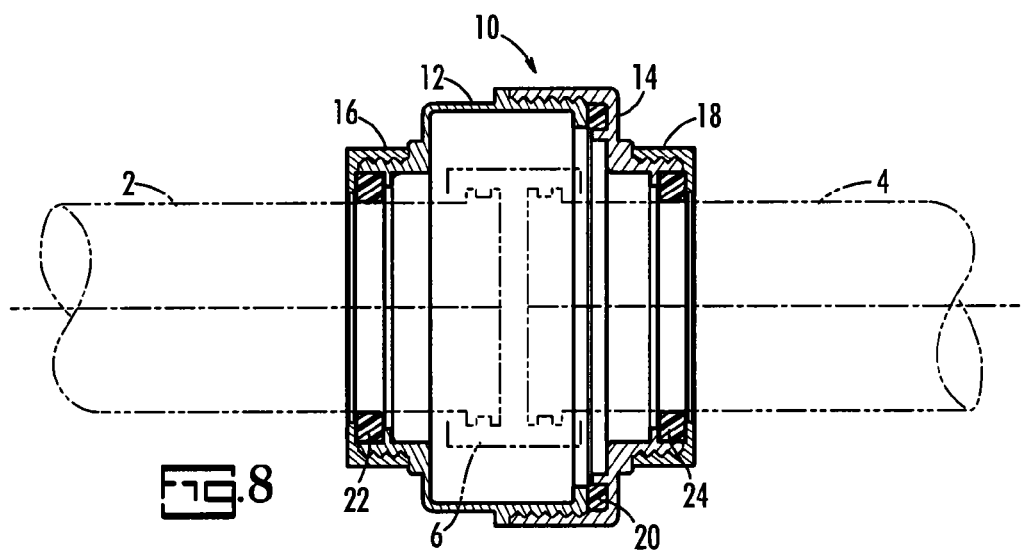
FIG. 8 is a cross-sectional view of a coupler according to one embodiment of the present invention installed on a longitudinally offset pipe joint.

For example, when the two points at which the coupler contacts the two pipes are A-A and A-A in FIG. 6, the degree of angular misalignment is shown as angle A. When the two points are moved farther apart, however, to points B-B and B-B, the degree of angular misalignment decreases. This means that the coupler of the present invention is more likely to maintain its seal around the joint between offset pipes than a coupler that contacts the pipes closer to the joint. This feature contributes to the ability of the coupler 10 of the present invention to maintain its seal around joints, even when they are offset laterally (FIG. 6), angularly (FIG. 7), or longitudinally (FIG. 8), or any combination of these modes.

Figure 9:
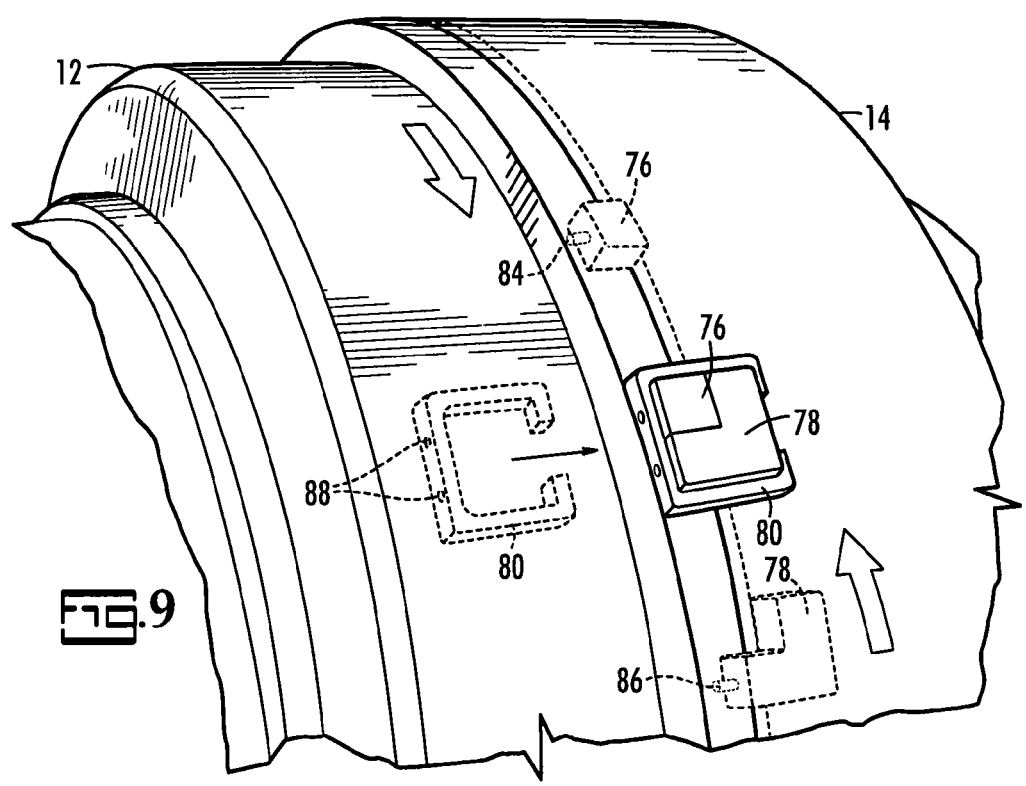
FIG. 9 is a detail view of a locking mechanism according to one embodiment of the present invention.
Figure 10:
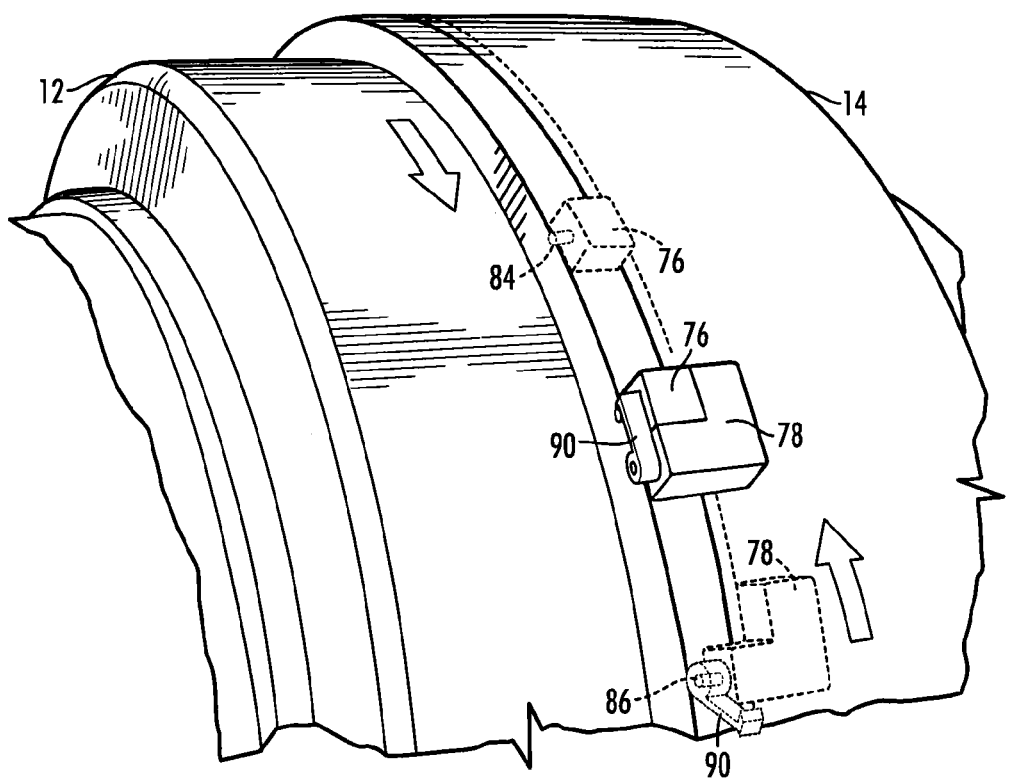
FIG. 10 is a detail view of a locking mechanism according to another embodiment of the present invention.
Figure 11:
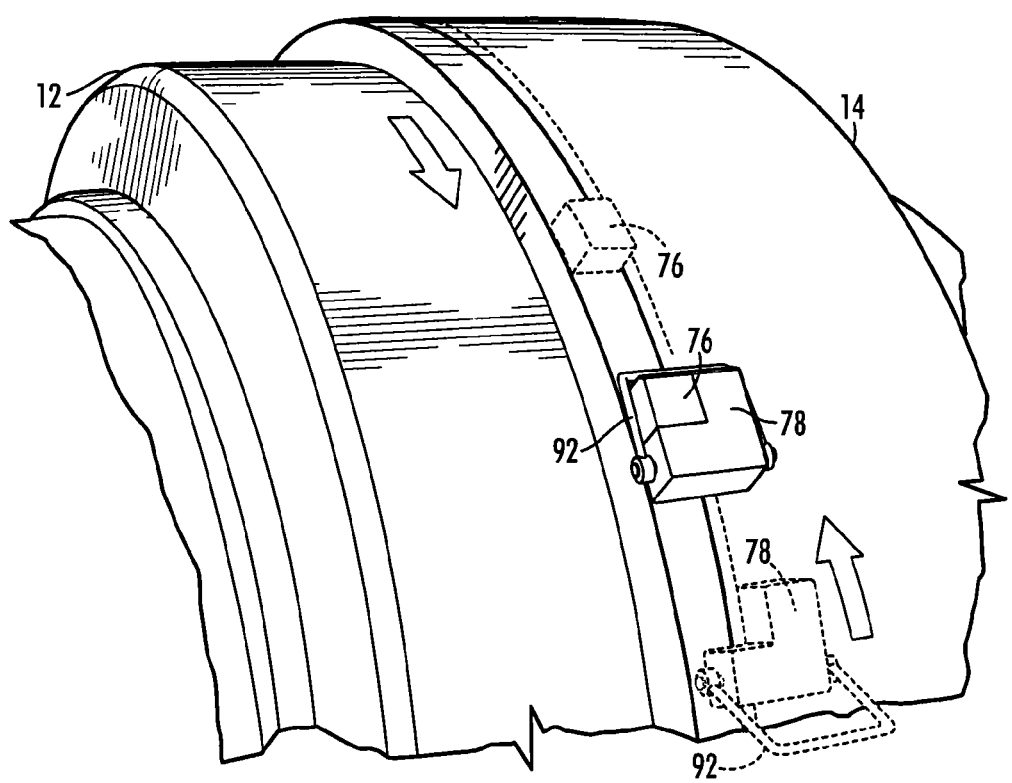
FIG. 11 is a detail view of a locking mechanism according to another embodiment of the present invention.

Turning now to FIG. 9, another feature of the present invention is that the rigid components 12, 14, 16, and 18 can be locked together. Locking the components prevents the coupler 10 from losing its seal around the pipe joint, even when the coupler 10 is subjected to vibration and/or substantial temperature swings. The specific embodiment of the present invention 10 shown in FIG. 9 has a locking mechanism comprised of a first tab 76 on first center section 12 and a second tab 78 on second center section 14. Tabs 76 and 78 have posts 84 and 86, respectively, extending therefrom. When the tabs 76 and 78 are brought together, a C-shaped clip 80 with holes 88 can be clipped onto the posts 84 and 86 and around tabs 76 and 78. FIG. 10 shows a similar locking mechanism that utilizes a latch 90 instead of a C-shaped clip. Latch 90 can be spring-loaded. FIG. 11 shows a third embodiment of the locking mechanism wherein tabs 76 and 78 and buckle 92 are used to ensure that first center section 12 and second center section 14 remain fully engaged. The means for locking of the present invention encompass all of these structural variations as well as any other latch or buckle known in the art that could be used to lock the two center sections 12 and 14 to one another or to cap rings 16 and 18.

Having hereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A coupler for sealing a joint between a first pipe and a second pipe, said coupler comprising:
   a cylindrical first center section having a first end and an opposing second end, said first end of said first center section having a threaded outer surface and a flanged inner surface, said second end of said first center section having a threaded outer surface and a flanged inner surface;
   a cylindrical second center section having a first end and an opposing second end, said first end of said second center section having a threaded inner surface dimensioned to engage said threaded outer surface of said second end of said first center section, said second end of said second center section having a threaded outer surface and a flanged inner surface;
   a cylindrical first cap ring having a first end and an opposing second end, said first end of said first cap ring having a flanged inner surface, said second end of said first cap ring having a threaded inner surface dimensioned to engage said threaded outer surface of said first end of said first center section;
   a cylindrical second cap ring having a first end and an opposing second end, said first end of said second cap ring having a threaded inner surface dimensioned to engage said threaded outer surface of said second end of said second center section, said second end of said second cap ring having a flanged inner surface;

a first gasket ring dimensioned to be received between said flange of said second end of said first center section and said second center section so that, when said first center section and said second center section are screwed together, said first gasket ring is squeezed between said flange of said second end of said first center section and said second center section forming a seal between said first center section and said second center section;

a second gasket ring dimensioned to encircle said first pipe and be received between said flange of said first end of said first cap ring and said flange of said first end of said first center section so that, when said first cap ring and said first center section are screwed together, said second gasket ring is squeezed between said flange of said first end of said first cap ring and said flange of said first end of said first center section forming a seal between said first cap ring, said first center section, and said first pipe;

a third gasket ring dimensioned to encircle said second pipe and be received between said flange of said second end of said second center section and said flange of said first end of said second cap ring so that, when said second center section and said second cap ring are screwed together, said third gasket ring is squeezed between said flange of said second end of said second center section and said flange of said first end of said second cap ring forming a seal between said second center section, said second cap ring, and said second pipe; and wherein said first center section has a first tab and said second center section has a second tab engagable with said first tab so that, when said first center section and said second center section are screwed together, said first tab and said second tab can be engaged.

2. The coupler of claim 1, said coupler further comprising:

a clip dimensioned to embrace said first tab and said second tab so that, when said first center section and said second center section are screwed together and said first tab and said second tab are engaged, said clip can be placed on said tabs thereby preventing said first center section from unscrewing from said second center section.

3. The coupler of claim 1 wherein said first tab has a first post and said second tab has a second post, said first and second posts positioned on said tabs so that, when said tabs are engaged, said posts are adjacent and parallel to one another, said coupler further comprising:

a clip dimensioned to embrace said first tab and said second tab, said clip having two holes therein so that, when said first center section and said second center section are screwed together and said first tab and said second tab are engaged, said clip can be placed on said tabs with said posts extending through said two holes thereby preventing said first center section from unscrewing from said second center section and securing said clip to said tabs.

4. The coupler of claim 1 wherein said first tab has a first post and said second tab has a second post, said first and second posts positioned on said tabs so that, when said tabs are engaged, said posts are adjacent and parallel to one another, said coupler further comprising:

a latch rotatably carried on said second post and dimensioned to be lockably engagable with said first post so that, when said first center section and said second center section are screwed together and said first tab and said second tab are engaged, said latch can be lockably engaged with said first post thereby preventing said first center section from unscrewing from said second center section.

\* \* \* \* \*